United States Patent [19]

Ashfield

[11] 4,114,479
[45] Sep. 19, 1978

[54] EPICYCLIC GEARING

[75] Inventor: Herbert Edward Ashfield, Huddersfield, England

[73] Assignee: David Brown Tractors Limited, Huddersfield, England

[21] Appl. No.: 807,855

[22] Filed: Jun. 20, 1977

[30] Foreign Application Priority Data

Jun. 24, 1976 [GB] United Kingdom ............... 26301/76

[51] Int. Cl.² ............................................. F16H 1/28
[52] U.S. Cl. ....................................... 74/801; 74/410; 192/4 A
[58] Field of Search ..................... 74/665 A, 674, 801, 74/410

[56] References Cited

U.S. PATENT DOCUMENTS

| | | | |
|---|---|---|---|
| 3,352,172 | 11/1967 | Teichmann | 74/410 |
| 3,772,940 | 11/1973 | Ohtsuka et al. | 74/785 |
| 3,834,498 | 9/1974 | Ashfield | 74/785 X |

Primary Examiner—Benjamin W. Wyche
Assistant Examiner—Frank H. McKenzie, Jr.
Attorney, Agent, or Firm—Robert D. Godard

[57] ABSTRACT

Epicyclic gearing comprises a sun gear journalled on a shaft and meshing with a plurality of planet pinions which mesh also with a rotationally fixed annular gear, the pinions being journalled in a planet carrier having a floating driving connection with a sleeve rigidly secured on the shaft by splines and a lock-nut, the floating connection including respective sets of external gear teeth on the sleeve and the lock-nut and two sets of internal gear teeth on the planet carrier which mesh with the respective sets of external gear teeth, and the tip diameter of one set of teeth on the planet carrier being greater than the tip diameter of the teeth on the lock-nut.

8 Claims, 1 Drawing Figure

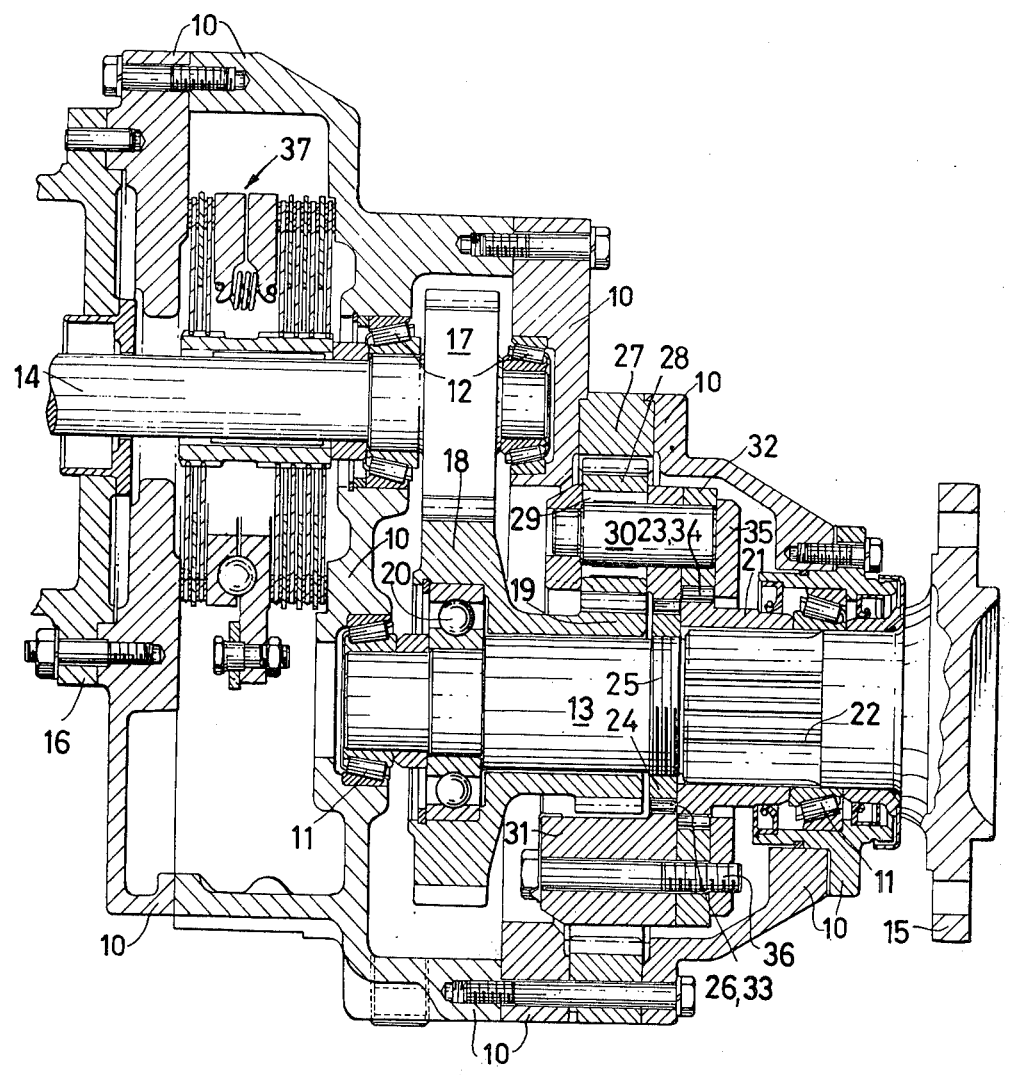

EPICYCLIC GEARING

BACKGROUND OF INVENTION

The invention relates to epicyclic gearing, particularly but not exclusively for the final drive assembly of an agricultural tractor.

The object of the invention is to provide a floating planet carrier, with the aim of minimising inequalities in the respective torque values transmitted by a plurality of planet pinions, having secure assembly means and a minimal axial length.

SUMMARY OF INVENTION

According to the invention, epicyclic gearing comprises a sun gear journalled on a shaft; a sleeve rigidly secured on the shaft and having a ring of external gear teeth; a lock-nut, for the sleeve, which engages with a screw thread formed on the shaft and has a ring of external gear teeth; an annular gear fixed against rotation; a plurality of planet pinions driveably interconnecting said gears; and a floating planet carrier driveably connected to the sleeve and comprising an annular body in which there are disposed spindles on which the respective planet pinions are journalled, the body having a ring of internal gear teeth which mesh with the teeth on the lock-nut with substantial backlash, an annular back-plate whose internal diameter is less than the tip diameter of the teeth on the sleeve, an annular disc having a ring of internal gear teeth whose tip diameter is greater than the tip diameter of the teeth on the lock-nut and which mesh with the teeth on the sleeve with substantial backlash, and means for clamping the disc between the body and the back-plate, the teeth on the sleeve being of such axial length that they fit with axial clearance between the body and the back-plate.

BRIEF DESCRIPTION OF DRAWINGS

A preferred embodiment of the invention will now be described, by way of example, with reference to the accompanying drawing which is a section on the centre-line of a final drive assembly for an agricultural tractor.

DESCRIPTION OF PREFERRED EMBODIMENT

Referring now to the drawing, a final drive assembly for an agricultural tractor comprises a composite casing 10 in which there are journalled in parallel relationship to one another, in respective pairs 11 and 12 of tapered roller bearings, a stub axle 13 and the outboard end of a half-shaft 14. The stub axle 13 has a flange 15 adapted to carry one of the tractor's driving wheels (not shown). The stub axle 13 and the half-shaft 14 are driveably interconnected by speed reduction gearing described more fully hereinafter and comprising a gear pair in series with epicyclic gearing. Two such final drive assemblies are adapted to be rigidly secured to the respective ends of an elongated rear axle case 16, housing at its mid-point conventional right-angled drive means (not shown) comprising a crown wheel and pinion and associated differential gearing adapted to drive the two half-shafts, so as to form a complete rear axle unit. Said pinion is driven in known manner from the tractor's engine by way of a main transmission clutch and a change-speed and reverse gearbox, none of these components being illustrated as they form no part of the present invention.

More specifically, the speed reduction gearing comprises a toothed pinion 17 co-axially formed integrally with the half-shaft 14 which meshes with a gear wheel 18 co-axially formed integrally with a sun gear 19, the gear wheel/sun gear cluster 18, 19 being journalled by means of a ball bearing 20 on the stub axle 13. A sleeve 21 rigidly secured on the stub axle 13 by means including splines 22 has a ring of external gear teeth 23. A lock-nut 24 which engages with a screw thread 25 formed on the stub axle 13 clamps the sleeve 21 endwise against one of the bearings 11 for the stub axle 13, and also has a ring of external gear teeth 26. An annular gear 27 fixed against rotation forms one component of the casing 10, and each of three planet pinions 28 meshes with both the sun gear 19 and the annular gear 27. The planet pinions 28 are journalled by means of needle bearings 29 on respective spindles 30 disposed in an annular body 31 and in a co-axial annular disc 32 which together form the major components of a floating planet carrier driveably connected to the sleeve 21 as hereinafter described. The body 31 has a ring of internal gear teeth 33 which mesh with the teeth 26 on the lock-nut 24 with substantial backlash, and the disc 32 also has a ring of internal teeth 34 whose tip diameter is greater than the tip diameter of the teeth 26 on the lock-nut 24 and which mesh with the teeth 23 on the sleeve 21 with substantial backlash. The planet carrier also includes an annular back-plate 35 whose internal diameter is less than the tip diameter of the teeth 23 on the sleeve 21, and three set-screws 36 for clamping the disc 32 between the body 31 and the back-plate 35. The teeth 23 on the sleeve 21 are of such axial length that they fit with axial clearance between the body 31 and the back-plate 35.

There are 43, that is to say a prime number of, teeth on each of the lock-nut 24 and the body 31, and 49 teeth on each of the sleeve 21 and the disc 32. Because the highest common factor of these gear tooth numbers has the smallest possible value, namely 1, only one of the teeth 26 on the lock-nut 24 and one of the teeth 23 on the sleeve 21 are in exact alignment with one another and likewise only one of the teeth 34 on the disc 32 and one of the teeth 33 on the body 31 are in exact alignment with one another, but there are teeth on the lock-nut 24 and the sleeve 21, and on the disc 32 and the body 31, in approximate alignment with one another over an appreciable arc. This feature, together with the provision of substantial backlash, facilitates the offering-up of the disc 32 and body 31 to the already assembled lock-nut 24 and sleeve 21 during assembly, as approximate lining-up of the internal and external teeth within said arc suffices. If desired, the respective numbers of teeth on the lock-nut 24 and the sleeve 21 can both be prime, but said numbers are preferably not equal. The use of equal nunbers of teeth is feasible, but would necessitate the use of shims to ensure that each of the teeth 26 on the tightened lock-nut 24 was in alignment with one of the teeth 23 on the sleeve 21. The choice of gear tooth numbers, on the lock-nut 24 and the sleeve 21 respectively, having a small highest common factor, for example two or three, would also facilitate assembly though to a lesser degree, but the choice of gear tooth numbers thereon having a relatively large highest common factor, for example 40 and 48 teeth respectively having a highest common factor of eight, would render assembly considerably more difficult because, although there are teeth in exact alignment at eight circumferentially-spaced points, the remaining teeth are well out of alignment so that precise lining-up of the internal and external teeth is essential.

A multi-disc brake indicated generally at 37 is disposed operatively between the half-shaft 14 and the casing 10, and is actuated hydraulically by a slave cylinder (not shown) housed within said casing.

The use of an axially-narrow externally-toothed lock-nut 24 has the dual advantages of minimisation of overall axial length and secureness of assembly.

In a modification, the planet carrier has a plurality of planet pinions some of which mesh with the sun gear 19 only and the rest of which mesh with the annular gear 27 only. In another modification, the toothed pinion 17 on each half-shaft 14 is co-axially secured rigidly thereto, and in a further modification, the sun gear 19 is co-axially secured rigidly to the gear wheel 18.

I claim:

1. Epicyclic gearing comprising a sun gear journalled on a shaft; a sleeve rigidly secured on the shaft and having a ring of external gear teeth; a lock-nut, for the sleeve, which engages with a screw thread formed on the shaft and has a ring of external gear teeth; an annular gear fixed against rotation; a plurality of planet pinions driveably interconnecting said sun gear and said annular gear; and a floating planet carrier driveably connected to the sleeve and comprising an annular body in which there are disposed spindles on which the respective planet pinions are journalled, the body having a ring of internal gear teeth which mesh with the teeth on the lock-nut with substantial backlash, an annular back-plate whose internal diameter is less than the tip diameter of the teeth on the sleeve, an annular disc having a ring of internal gear teeth whose tip diameter is greater than the tip diameter of the teeth on the lock-nut and which mesh with the teeth on the sleeve with substantial backlash, and means for clamping the disc between the body and the back-plate, the teeth on the sleeve being of such axial length that they fit with axial clearance between the body and the back-plate.

2. Epicyclic gearing according to claim 1, wherein each spindle is disposed in the disc as well as in the body.

3. Epicyclic gearing according to claim 1, wherein the respective numbers of teeth on the sleeve and the lock-nut have a small highest common factor.

4. Epicyclic gearing according to claim 3, wherein the highest common factor is 1, that is to say wherein at least one of said numbers is prime.

5. Epicyclic gearing according to claim 1, wherein the shaft constitutes a wheel-carrying stub axle of a final drive assembly for a vehicle and the sun gear is co-axially secured rigidly to or formed integrally with a gear wheel which meshes with a toothed pinion coaxially secured rigidly to or formed integrally with a half-shaft of the vehicle, the stub axle and the half-shaft being parallel to one another.

6. Epicyclic gearing according to claim 5, wherein a brake is disposed operatively between the half-shaft and a fixed casing.

7. Epicyclic gearing according to claim 6, wherein the brake is a multi-disc brake.

8. Epicyclic gearing according to claim 6, wherein the brake is actuated hydraulically.

* * * * *